Feb. 27, 1945.  N. M. MARSILIUS  2,370,366
WORK SUPPORT
Filed Sept. 27, 1943   2 Sheets-Sheet 1
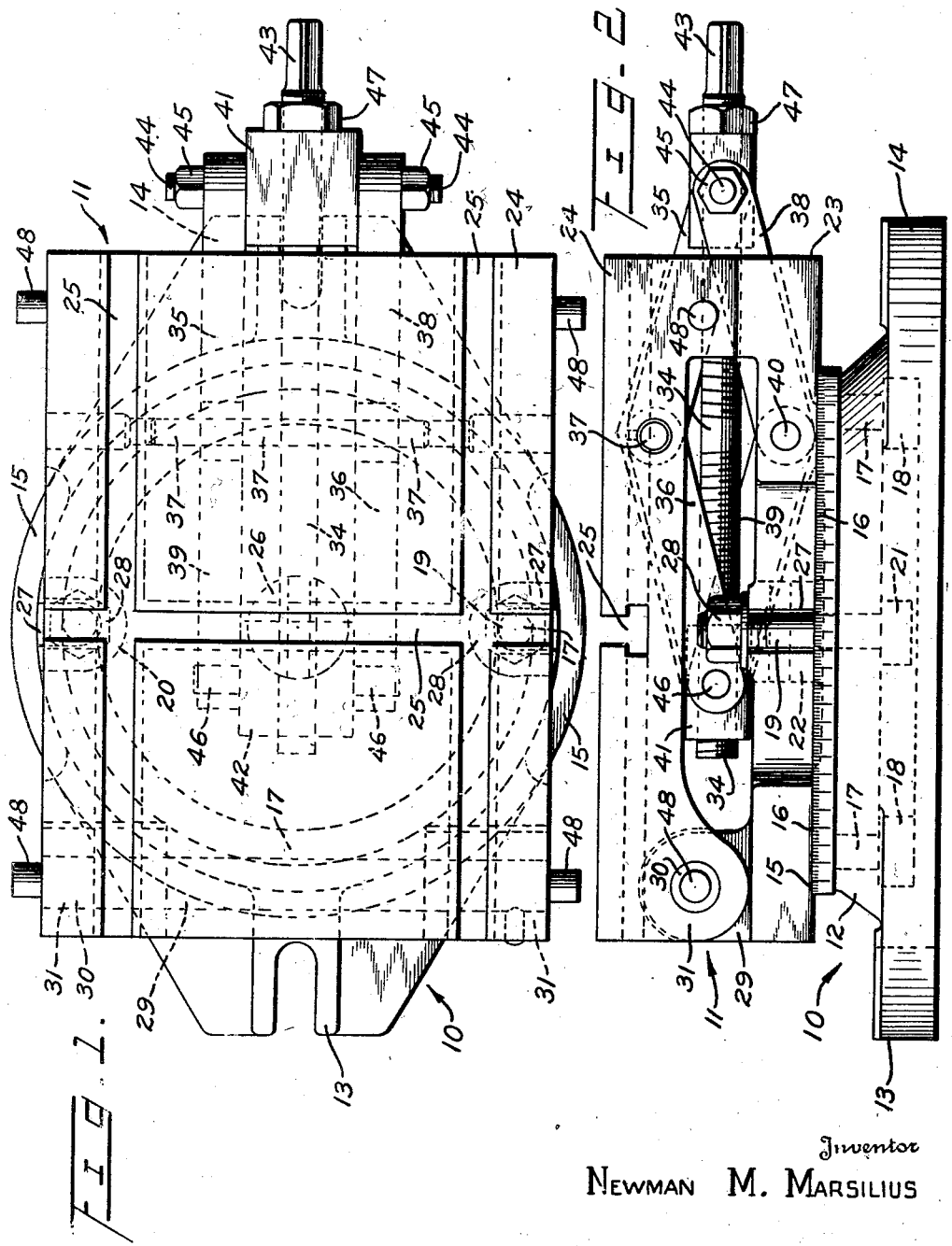
Inventor
NEWMAN M. MARSILIUS
By John F. Hanrahan
Attorney Feb. 27, 1945.　　　N. M. MARSILIUS　　　2,370,366
WORK SUPPORT
Filed Sept. 27, 1943　　　2 Sheets-Sheet 2
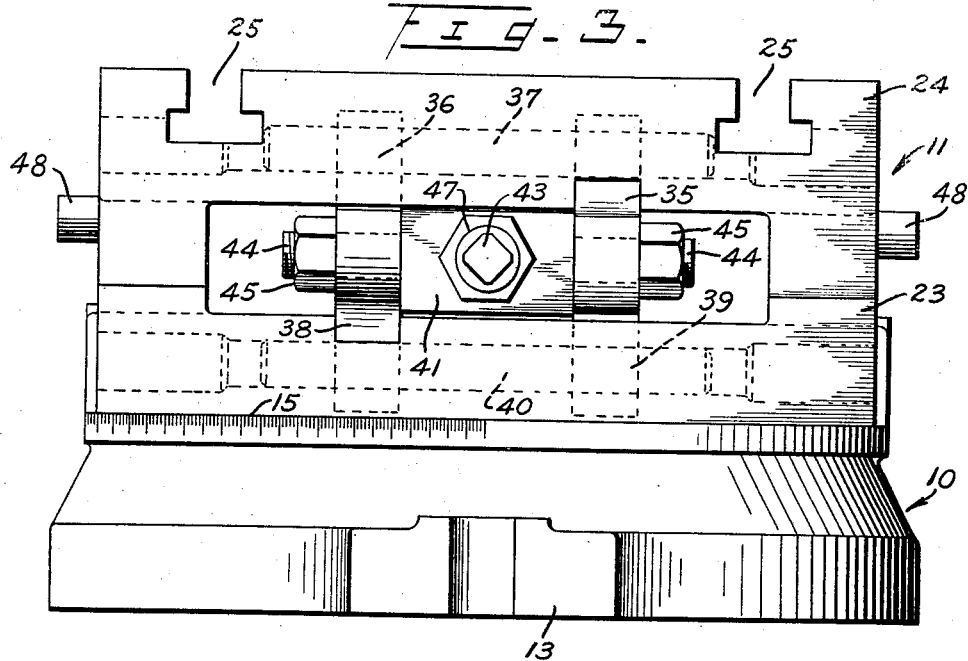
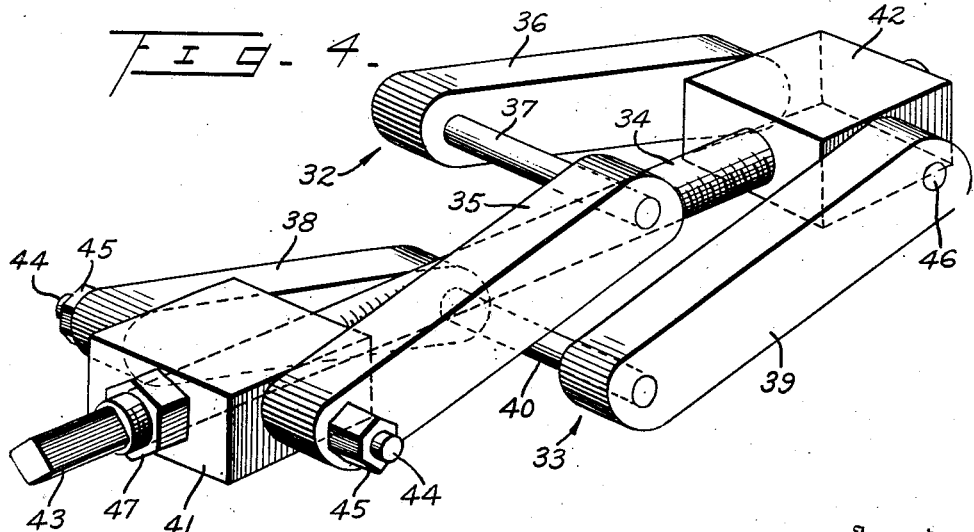
Inventor
NEWMAN M. MARSILIUS
By John F. Hanrahan
Attorney Patented Feb. 27, 1945

2,370,366

UNITED STATES PATENT OFFICE 2,370,366

WORK SUPPORT

Newman M. Marsilius, Trumbull, Conn.

Application September 27, 1943, Serial No. 503,956

1 Claim. (Cl. 90—60)

This invention relates to new and useful improvements in work supports and has particular relation to a support adapted for mounting on a machine bed or the like to support work at any desired angle for engagement by a tool or tools of the machine.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claim.

In the drawings:

Fig. 1 is a top plan view of the work holder of the invention;

Fig. 2 is a side elevational view of such work holder;

Fig. 3 is a front elevational view thereof on a larger scale; and

Fig. 4 is a perspective view, of the scale of Fig. 3, of the means employed for adjusting the work holder part of the present support to vary the angle at which the work is supported.

Referring in detail to the drawings the work holder of the invention comprises a base generally designated 10 and a head generally designated 11 and mounted on said base. Base 10 includes a relatively thick body portion 12 having a pair of bifurcated extensions 13 and 14 for the receptions of bolts or other securing means by which the base may be secured in position on a machine bed or other surface. The body of the base 10 may be tapered as shown and such body has an upper side surface 15 and is shown as graduated about the edge of such surface at 16.

Opening through the upper side surface 15 of the base is an annular slot 17. Inwardly of surface 15 the slot is laterally enlarged at 18 (Fig. 2) whereby the slot while annular is of inverted T-shape in transverse section. A pair of bolts 19 and 20 have their heads 21 disposed in the inner laterally enlarged portion 18 of the slot and the shanks of these bolts extend outwardly through slot 17 and in cooperation with nuts, as will appear, serve to secure the head 11 in adjusted positions on the base 10. A short stud 22 extends outwardly from the center of the upper side of base 10.

Head 11 comprises an inner part 23 and an outer part 24. Part 24 is provided with various T-slots 25 opening through its outer surface for use in mounting work on this part and part 24 therefore comprises the work holder portion of the present work support. Each of the parts 23 and 24 is shown as somewhat plate-like and the underside of part 23 is disposed on the upper or outer side 15 of the base and is provided with a central opening 26 receiving the stud 22 of the base. Additionally, in its sides the inner part 23 is provided with bifurcations or notches 27 for the reception of the shanks of the bolts 19 and 20, above mentioned.

On the bolts 19 and 20 at the upper side of part 23 are nuts 28. Clearly on tightening of these nuts the part 23 is clamped against the upper side 15 of the base 10 and on loosening of these nuts the inner head part 23 may be turned on the base for angular adjustment of the head 11 in a plane parallel with that of side 15 of the base. Stud 22 and opening 26 serve as centering means for the described adjustments of the head on the base. Following any adjustment the nuts 28 are tightened to secure the part 23 and thus the entire head 11 in the desired adjusted relation to the base.

Toward one end part 23 is provided with a raised ear-like portion 29 through which passes a pivot pin 30 having mounted on its end portions the ear-like portions 31 on the underside and adjacent the rear edge of the outer or upper part 24. In this way the outer part 24 is pivotally mounted at one of its ends on the inner part 23 for pivotal movement and adjustment relative to such inner part. Improved means are provided for shifting or adjusting the part 24 about or with the pivot 30 and for securing such part in any chosen adjusted position.

The mentioned means is in the form of a pair of upper and lower or inner and outer toggle joints 32 and 33 respectively. This means, shown best in Fig. 4, is adapted for manual operation and the toggle joints are collapsed and straightened by turning of a feed screw 34 oppositely threaded on its respective end portions. Toggle joint 32 comprises a pair of links 35 and 36 whose inner portions are pivotally connected by a rod 37 whereby to form a knee. Toggle joint 33 is similarly formed and comprises a pair of links 38 and 39 connected at their inner ends by a rod 40 whereby to form a knee.

A pair of spaced blocks 41 and 42 have the feed screw 34 threaded therethrough and at the forward side of block 41 the end 43 of the feed screw is squared or otherwise shaped for engagement by a wrench or other tool to be used for turning the screw. At their forward ends the links 35 and 38 are pivotally connected to the block 41 as by studs 44 having nuts 45 thereon for tightening against the outer sides of the links. At their rear ends the links 36 and 39 are pivotally connected with the block 42 by studs 46.

With the described construction see particularly Fig. 4) it will be understood that on turning of screw 34 in one direction the blocks 41 and 42 will be moved toward one another and that on turning of the screw in the opposite direction said blocks will be moved from one another. Thus as the screw is turned in the first direction the toggle joints 32 and 33 are moved toward expanded condition and as the screw is turned in the opposite direction the said joints are moved in a direction to straighten them. The movement of the joints toward expanded condition involves the movement of their knees from one another.

In the present work support the described toggle means is arranged to enter between the inner and outer parts 23 and 24 such parts being centrally spaced even when in parallel relation as shown in the drawings. The pivot rods 37 and 40 of the knees of the respective toggle joints 32 and 33 pivotally connect said knees with the outer and inner parts 23 and 24 respectively. Thus it will be clear that any movement of the knees of the toggle joints toward and from one another must result in similar movement of the outer part 24 relative to the inner part 23.

A jam nut 47 is threaded onto the feed screw 34 at the forward side of the block 41. On loosening of this nut and the nuts 45 the toggle means disclosed is adapted to be operated to raise and lower the part 24 relative to the part 23 by movement of the first named part on the pivot 30. Clearly the part 24 may be given very minute and accurate adjustment to dispose its upper or outer surface in the desired angular relation to any surface on which the base 10 may be disposed. Following any adjustment the nuts 45 and 47 are tightened to secure the parts against casual movement.

Base 10 may be secured to a machine bed, as the bed of a milling machine or the like, and on loosening of the nuts 28 the head 11 may be given angular adjustment relative to the base and in the plane of the outer or upper side 15 of the latter. This is to dispose any work on the outer part or holder 24 in the desired relation to the path of movement of a cutter, or in the desired relation to a cutter, if the present support is mounted on a machine part which is to have movement relative to a cutter.

In addition to the above the outer head part 24, or the work holder part 24 of the present support, may be angularly adjusted in a plane at right angles to that in which the head 11 may be adjusted relative to the base 10. Further adjustment of part 24 with or about the pivot pin 30 may be made with the utmost precision. Relatively large or relatively small adjustments may be made. When an adjustment has been made, either of the head 11 on the base or of the part 24 on the part 23, the parts are thereafter locked in adjusted positions by tightening of the nuts provided for that purpose. Laterally projecting pins 48 are provided for use with a sine-bar when making a very accurate adjustment of the head part 24 on the head part 23.

Having thus set forth the nature of my invention, what I claim is:

In a work support a head comprising inner and outer parts of which the outer part is adapted to have work mounted thereon, means pivotally mounting said outer part on said inner part for angular adjustment relative thereto, a pair of toggle joints entering between said parts and comprising a pair of rods mounted one on each of said parts and disposed parallel to said pivoting means and to one another, two outer links each pivotally connected at one end to the rod mounted on the outer part, said links laterally spaced and connected with spaced portions of said rod, two inner links each pivotally connected at one end to the rod mounted on the inner part, said links laterally spaced and connected with spaced portions of said rod, a bar extending between and at right angles to said rods and oppositely threaded on its respective end portions, a nut on each of said threaded end portions, and means pivotally connecting the other ends of the respective outer two and inner two links with opposite sides of said nuts whereby on turning of the bar the nuts are moved toward and from one another to expand and straighten said toggle joints and thereby adjust the outer head part on said pivotal mounting relative to the inner head part and whereby the thrust against the outer head part is over the length of the rod mounted thereon.

NEWMAN M. MARSILIUS.